(12) United States Patent
Tulodziecki et al.

(10) Patent No.: US 12,368,185 B2
(45) Date of Patent: Jul. 22, 2025

(54) HYBRID SOLID STATE ELECTROLYTE

(71) Applicant: Nederlandse Organisatie voor toegepast-natuurwetenschappelijk onderzoek TNO, 's-Gravenhage (NL)

(72) Inventors: Michal Tulodziecki, Woluwe-Saint-Lambert (BE); Sandeep Unnikrishnan, Veldhoven (NL); Lucas Augustinus Haverkate, Utrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 638 days.

(21) Appl. No.: 17/414,645

(22) PCT Filed: Dec. 19, 2019

(86) PCT No.: PCT/NL2019/050856
§ 371 (c)(1),
(2) Date: Jun. 16, 2021

(87) PCT Pub. No.: WO2020/130822
PCT Pub. Date: Jun. 25, 2020

(65) Prior Publication Data
US 2022/0052378 A1    Feb. 17, 2022

(30) Foreign Application Priority Data
Dec. 19, 2018 (EP) .................... 18214047

(51) Int. Cl.
*H01M 10/0565* (2010.01)
*H01M 10/0525* (2010.01)
*H01M 50/434* (2021.01)

(52) U.S. Cl.
CPC ... *H01M 10/0565* (2013.01); *H01M 10/0525* (2013.01); *H01M 50/434* (2021.01);
(Continued)

(58) Field of Classification Search
CPC ......... H01M 10/0565; H01M 10/0525; H01M 10/0568; H01M 10/4235; H01M 10/052;
(Continued)

(56) References Cited

U.S. PATENT DOCUMENTS

2017/0187063 A1* 6/2017 Pistorino ............. H01M 10/056
2017/0301949 A1* 10/2017 Mimura ................ H01M 4/602
(Continued)

FOREIGN PATENT DOCUMENTS

CN    108886164 A    11/2018
EP      1598896 A1    11/2005
(Continued)

OTHER PUBLICATIONS

European Patent Office, International Search Report in corresponding International Application No. PCT/NL2019/050856, dated Mar. 3, 2020 (2 pages).

*Primary Examiner* — Matthew W Van Oudenaren
(74) *Attorney, Agent, or Firm* — Leydig, Voit & Mayer, Ltd.

(57) ABSTRACT

The present disclosure concerns a solid state electrolyte for providing an ion conductive connection between a negative and positive electrode in a battery, the solid state electrolyte comprising: an ion conductive matrix comprising a polymer, and a metal salt dispersed in the ion conductive matrix, and a first ceramic material, wherein at least one of the faces of the ion conductive matrix for connecting to the negative or positive electrode, is infiltrated with the first ceramic material to form a first, hybrid interface layer.

18 Claims, 3 Drawing Sheets

(52) U.S. Cl.
CPC ............... *H01M 2300/0091* (2013.01); *H01M 2300/0094* (2013.01)

(58) Field of Classification Search
CPC ............. H01M 50/434; H01M 50/446; H01M 50/461; H01M 50/451; H01M 50/457; H01M 2300/0091; H01M 2300/0094; H01M 2300/0082; H01M 2300/0065
See application file for complete search history.

(56) References Cited

U.S. PATENT DOCUMENTS

2018/0026302 A1\* 1/2018 Kumar .................... H01M 4/38
429/144
2020/0303729 A1\* 9/2020 Kim ...................... H01M 4/131

FOREIGN PATENT DOCUMENTS

| | | |
|---|---|---|
| JP | 2000348711 A | 12/2000 |
| JP | 2009544121 A | 12/2009 |
| JP | 2016524803 A | 8/2016 |
| KR | 20170102001 A | 9/2017 |
| WO | WO2017171187 | \* 10/2017 |

\* cited by examiner

HYBRID SOLID STATE ELECTROLYTE

CROSS-REFERENCE TO RELATED APPLICATIONS

This patent application is a U.S. National Phase of PCT International Application No. PCT/NL2019/050856, filed Dec. 19, 2019, which claims priority to European Application No. 18214047.5, filed Dec. 19, 2018, which are both expressly incorporated by reference in their entireties, including any references contained therein.

TECHNICAL FIELD AND BACKGROUND

The present disclosure relates to solid state polymer electrolytes for alkaline (earth) metal batteries and a method for the manufacturing thereof.

In alkaline (earth) metal based batteries, the negative electrode is comprises an electrochemically active metal. Due to safety issues, e.g. due to flammability, state-of-art in metal-ion batteries, e.g. lithium-ion batteries with liquid electrolytes, are not suitable for application in metal batteries. In stead, solid state electrolytes, e.g. polymer and ceramic electrolytes may be used. Polymer based electrolytes, compared to ceramic electrolytes may be preferred because of easier processing of such materials. However, the use of solid state polymer electrolytes at ambient conditions, e.g. at room temperature, often leads to poor battery performance. It is believed that poor battery performance may originate from high contact resistance between the polymer electrolyte and the metal electrode material. Furthermore, the bulk ion conductivity of solid electrolytes is decreased when the temperature is lowered. In the case of polymer electrolytes, at lower temperatures, polymer chains are internally less mobile. For example, an incompatible interface may be formed with high resistance. Better performance may be obtained by operating a metal-polymer-battery at elevated temperatures. Lithium Metal. Polymer (LMP®) batteries, produced by Blue Solutions SA (a subsidiary of the Bolloré Group), contain a polymer electrolyte and operate at temperatures above 60° C. for good performance. In electronic devices electronic circuits may be equipped with current collectors of a type such as in electrochemical devices. For example an electrochemical device is a battery such as a rechargeable Li-ion solid-state battery having current collector of non-planar design. In discharging battery mode, the anode is the "negative electrode" to which the positive current flows, from the cathode, being the "positive electrode". During charge these functions are reversed. Irrespective of charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode during battery discharge) materials are Li4Ti5O12 (Lithium Titanate spinel or LTO); LiC6 (Graphite); Li4.4 Si (Silicon) and Li4.4Ge (Germanium) known positive electrode (cathode) materials are LiCoO2 (Lithium Cobalt oxide or LCO), LiCoPO4, (doped) LiMn2O4 (Lithium manganese oxide spinel or LMO), LiMnPO4, LiFePO4 (LFP), LiFePO4F (LFPF) or LiCo1/3Ni1/3Mn1/3O2 (LCNMO).

Thin film batteries, including those of the thin film solid state lithium ion type, can be prepared from various deposition techniques to fabricate negative electrode, positive electrode, and electrolyte materials bonded together to form the battery. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired. When batteries comprising a polymer solid state electrolyte are operated at high temperatures the polymer electrolyte softens which makes the system susceptible to dendrite growth. US2018026302 describes a porous polyethene separator, for use in combination with a liquid electrolyte, that is coated with a ceramic material to prevent dendrite propagation. However, the described electrolyte does not address the contact resistance problems and moreover uses liquid electrolyte which could lead to safety issues, for example when the cell temperature is high and, as a result of a short circuit, the liquid electrolyte may catch fire.

Alternatively, ion conductive ceramic materials may be used as electrolyte material. Such material may form a more compatible interface with electrode materials. However, such ceramic electrolyte materials have typically limited bulk ion conductivity and are further typically difficult to handle and very brittle which makes batteries comprising solid state ceramic electrolytes prone to cracking and/or other forms of failure. A publication by S. Zekloll et al. in Energy & Environmental Science, 2018, 11, pages 185-201, describes a microporous 3D-printed ion conductive ceramic electrolyte structure, wherein the pores are filled with polypropylene or epoxy polymer. The disclosed polymer/ceramic microstructured electrolyte shows improved mechanical properties but at the cost of ion conductivity.

Accordingly a need exists for providing a solid state electrolyte which combines good bulk ion conductivity, ion transference number and low interface resistance.

The present disclose aims to provide a solid state electrolyte, and process for the manufacture thereof, which mitigates one or more of the described limitations by providing a solid state electrolyte comprising a polymer matrix with an infiltrated ceramic phase.

SUMMARY

Aspects of the present disclosure relate to a solid state electrolyte suitable for providing an ion conductive connection between a negative and positive electrode in a battery. The solid state electrolyte comprises: an ion conductive matrix comprising a polymer, a metal salt dispersed in the ion conductive matrix, and a first ceramic material, wherein at least one of the faces of the ion conductive matrix for connecting to the negative or positive electrode, is infiltrated with the first ceramic material to form a first hybrid interface layer with improved ion conductivity between at least one of the negative and positive electrodes in the battery and the ion conductive matrix.

In some embodiments the present disclosure relates to a solid state electrolyte, wherein both faces of the ion conductive matrix for connecting to the electrodes of a battery, are infiltrated with ceramic material to form first and second hybrid layers. The second hybrid layer may comprise a second ceramic material, different from the fist. Alternatively, the second hybrid layer may comprise the same ceramic material as the first hybrid layer.

In some preferred embodiments one or more of the faces of the ion conductive matrix for connecting to the electrodes is provided with a first capping layer. The first capping layer comprises one or more of an ion conductive ceramic material, and a ceramic material that forms an ion conductive material from a reaction between the ceramic material and a negative electrode material.

Aspects of the present disclosure further relate a process and product obtainable thereby for the manufacture of the disclosed solid state electrolytes. The process comprises: providing an ion conductive matrix comprising a polymer and dispersed metal salt; and exposing a first face of the ion conductive matrix with a vapor phase ceramic precursor material. The vapor phase ceramic precursor material, infiltrates the ion conductive matrix, and reacts with a co-reactant to form a hybrid layer. Such an infiltration potentially leads to dispersion of the ceramic (nano) particles within the polymer matrix and may help in increasing the ion conductivity through it.

The co-reactant comprises one or more from a group consisting of: water, hydrogen sulfide, and an oxidizing plasma. In some embodiments, the co-reactant may be provided to the ion conductive matrix $10m$ from the gas phase. Alternatively or in addition, when the co-reactant is water, the co-reactant may be present within the ion conductive matrix. For example, suitable amounts of water may be introduced into the ion conductive matrix in a step of forming the ion conductive matrix.

In some preferred embodiments, the process comprises providing a ceramic capping layer.

BRIEF DESCRIPTION OF DRAWINGS

These and other features, aspects, and advantages of the apparatus, systems and methods of the present disclosure will become better understood from the following description, appended claims, and accompanying drawing wherein:

DETAILED DESCRIPTION

Figure 1A:
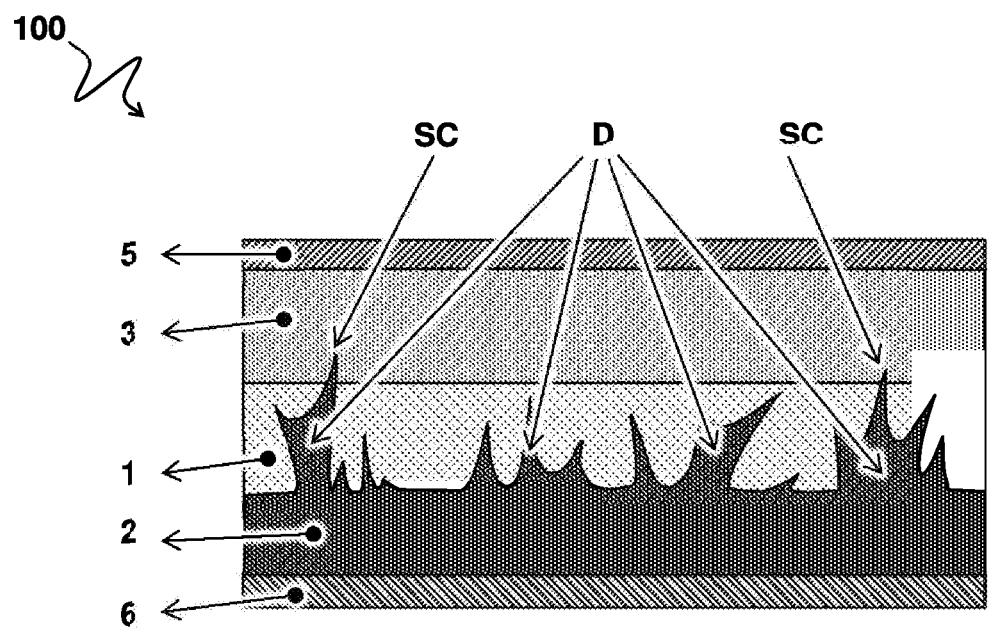
FIG. 1A illustrates a battery stack comprising a solid state electrolyte prone to dendrite formation.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be manufactured or operated in a particular orientation unless stated otherwise.

FIG. 1A schematically illustrates a cross-section view of a comparative battery stack 100. The depicted comparative battery stack comprises a solid state bottom current collector 6, a solid state negative electrode layer 2 (anode), a solid state electrolyte layer 1 consisting of a mixture of a metal salt and an ion conductive polymer, a solid state positive electrode layer 3 (cathode), and solid state top current collector 5. The solid state electrolyte layer serves as a layer that facilitates the transport of ions, or in other words conduct ions, from the negative electrode to the positive electrode during a discharge cycle of the battery and vice-versa during a charging cycle of the battery. Typically, the negative electrode comprises lithium metal, and the solid state electrolyte comprises a polymer matrix suitable for the conduction of lithium ions. FIG. 1A further illustrates a typical dendrite formation problem that may occur with such battery when, for example, operated at elevated temperatures, e.g. at temperatures above 60° C.

Without wishing to be bound by theory it is believed that during a charging cycle lithium ions are transported through the solid state electrolyte layer to be reduced to an electrochemically active state at the interface with the negative electrode. However, rather than forming a uniform electrode layer, dendrites D, e.g. sharp needles or spikes, may form of the electrode material that stick outward into the solid state electrolyte layer. Such dendrites may grow until these eventually pierce through solid state electrolyte layer and reach the positive electrode material where they cause dangerous short circuits SC. It is believed that number of factors play an important factor in this process. Besides operating conditions such as charging rate, temperature and potential, these factors include: electrolyte layer thickness, electrolyte layer hardness, and field distribution during charging. Uneven field distribution may lead to uneven and localized electrode material deposition which may lead to further uneven field distribution and thus aggravate dendrite formation. Soft and/or thin solid state electrolyte layers may further increase the risk of dendrite formation.

Figure 1B:
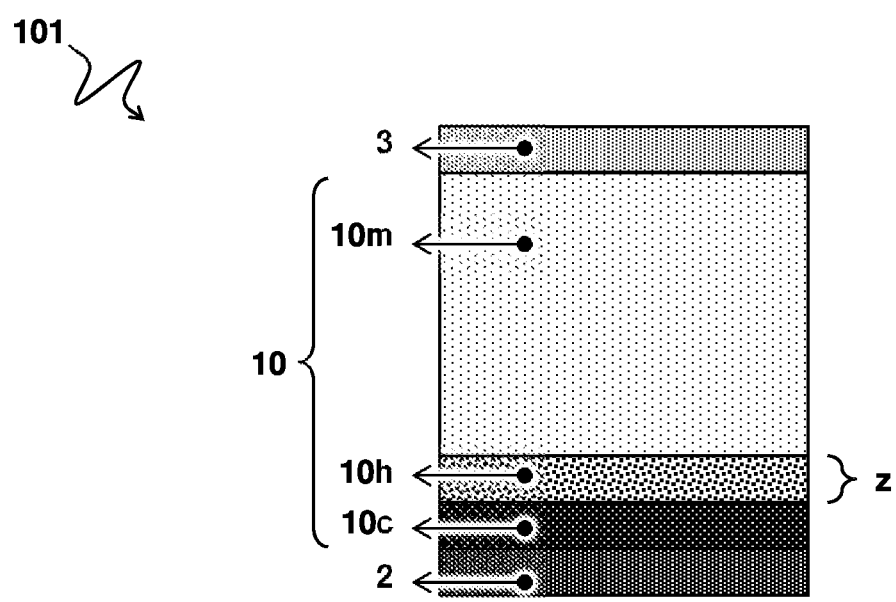
FIG. 1B illustrates a battery stack comprising a solid state electrolyte comprising a first hybrid layer.

FIG. 1B schematically illustrates a cross-section of a battery 101 comprising a solid state electrolyte 10 according to one or more aspects of the present invention. The battery is formed from a stack of layers comprising a negative electrode 2 and a positive electrode 3 separated from each other by solid state electrolyte 10. Top and bottom current collectors are not shown. According to an aspect of the invention the solid state electrolyte 10 comprises an ion conductive matrix $10m$. In the embodiment as shown the solid state electrolyte 10 comprises a hybrid layer $10h$ and a capping layer $10c$ at the face connecting to the negative electrode. The thickness z of the hybrid layer $10h$ is indicated. Thickness z of the hybrid layer preferably is within a range from 10 nm up to 50 µm, more preferably in a range between 50 nm and 20 μm, most preferably in a range between 100 nm and 10 μm, e.g. 250 nm or 1 μm. Alternatively or in addition the, solid sate electrolyte may span je majority of the thickness of the solid state electrolyte layer.

According to a first aspect the herein disclosed solid state electrolyte 10 comprises an ion conductive matrix 10m. Disclosed solid state electrolytes 10 are suitable for providing an ion conductive connection between a positive and a negative electrode of a battery, e.g. a rechargeable battery.

The negative electrode (anode) of a battery may comprise one or more metals of a group consisting of Li, Na, K, Mg, Ca, and Al, silicon and tin, graphite. Alternatively or in addition the negative electrode may comprise conversion materials, e.g. corresponding metal oxides MO, or mixtures thereof. The positive electrode (cathode) may comprise insertion or conversion based materials. Suitable materials may, for example, be selected from a group consisting of metal oxides, silicon, graphitic materials, sulphur, phosphates, oxygen, and air. For Li-ion batteries it may for example comprise $LiCoO_2$, $MnO_2$, $LiMn_2O_4$, $LiNiO_2$, $Li_xMn_yNi_zO_2$, $LiNi_{1-x}Co_xO_2$, $LiNi_xCo_yAl_zO_2$, $Li(Ni_{1/3}Mn_{1/3}Co_{1/3})_2$, $Li(Ni_xMn_yCo_{1-x-y})O_2$, $Li(Li_xMn_yNi_zCo_{1-x-y-z})O2$, $LiFePO_4$, $Li_2FePO_4F$, $V_2O_5$, $V_2O_5\text{-}TeO_2$, $WO_3\text{-}V_2O_5$, $TiS_xO_y$, metal oxides $MO_x$, metal fluorides $MF_x$, metal chlorides $MCl_x$, metal sulphides $MS_x$ or $Li\text{-}V_2O$. For other ion insertion type batteries, the positive electrode layer may for example comprise similar materials as listed above for Li-ion batteries, but with the Li being substituted by the other ion. For example, for Na-ion batteries the first electrode layer 12 may e.g. comprise $NaMn_2O_4$; for Mg-ion batteries the first electrode layer may e.g. comprise $MgMn_2O_4$; and for Al-ion batteries the first electrode layer may e.g. comprise $Al_xV_2O_3$, the present disclosure not being limited thereto.

According to a further aspect the ion conductive matrix comprises a polymer P, and a metal salt S. Preferably, the metal salt S is dispersed in the ion conductive matrix 10m. The ion conductive matrix 10m forms an ion conductive medium. From FIG. 1B it becomes clear that the medium may be a single continuous layer. For example, the ion conductive matrix 10m may form a homogeneous layer of material. Alternatively or in addition, the ion conductive matrix 10m may comprise nanopores. In the case, wherein the medium is a dense material, small voids may nevertheless be present, for example in the form of interstitial spaces. Such interstices may for example be present between adjacent polymer chains comprised in the medium. Alternatively or in addition, further voids may be presents in the form of (nano) pores. In some embodiments the ion conductive matrix 10m may comprise a gelled polymer.

The ion conductive matrix 10m typically comprises polyether-type polymers. Such polymers may be selected from a group consisting of, but not limited to: polyethylene oxide (PEO), polypropylene oxide (PPO), polybutylene oxide, and/or blends and/or derivatives of thereof, e.g. block copolymers. The ion conductive matrix 10m further comprises a metal salt, preferably the metal salt comprises weakly coordinating anions, such as but not limited to: perchlorates ($ClO_4$), bis(trifluoromethane)sulfonimides (TFSI), bis(fluorosulfonyl)imides (FSI), and fluorophosphates ($PF_6$). Alternatively or in addition, the ion conductive matrix 10m may also comprise a gel-based electrolyte, e.g. a gelled mixture of polymer and a liquid electrolyte or other additives like succinonitrile anchor ionic liquids Preferably, the metal salt S comprises a metal ion that corresponds to the metal comprised in the negative electrode of a battery the solid state electrolyte 10 is suitable for. For example, for a battery stack wherein the negative electrode comprises metal lithium, the metal salt S comprises a lithium ion.

According to a further aspect, the ion conductive matrix 10m comprises a first ceramic material C1. This material is disposed to the ion conductive matrix 10m such that at least one of the faces of the ion conductive matrix 10m for connecting to the negative or positive electrode, is infiltrated with the first ceramic material C1. In some preferred embodiments the ion conductive matrix 10m has a thickness below 100 micrometer, preferably below 25 micrometer, for example, in a range between 25 micrometer and 5 micrometer, or between 10 micrometer and 1 micrometer.

With infiltrating the ion conductive matrix 10m it may be understood that the ceramic material penetrates in to the solid state electrolyte 10 layer from a face towards the bulk. In some preferred embodiments the first ceramic material C1 is infiltrated into the ion conductive matrix 10m, forming a first hybrid layer 10h1 that extends from a first face of the solid state electrolyte 10 into the bulk of the solid state electrolyte. The thickness of the first hybrid layer z is preferably at least 1% of the thickness of the ion conductive matrix 10m. Optionally, the first hybrid layer may be ticker, e.g. 5%, 20%, 50%, or more, up to 100%, extending all the way to the opposing face of the ion conductive matrix 10m.

In some preferred embodiments, the ceramic is formed in small ceramic domains. Preferably, the ceramic domains comprise at least one dimension on a mesoscopic scale. In other words, the ceramic domains in the hybrid layer preferably have at least one dimension, e.g. a diameter, which has a size in a range larger than an atomic scale but smaller than a macroscopic scale. For example, the mesoscopic ceramic domains comprise at least one dimension in the range of 1 nm to 5 μm, preferably in a range between 5 nm and 1 μm, more preferably between 10 nm and 500 nm.

An increased interface area between polymeric matrix and infiltrated ceramic surface may reduce contact resistance between on electrode and formed solid state electrolyte 10. In all polymeric solid state electrolytes the interface contact resistance is believed to be governed by the interface area between polymer and electrode. By creating a hybrid material interface resistance may separated into an interface contact resistance between the ceramic and electrode and an interface resistance between polymer matrix and ceramic inside the hybrid layer. By increasing the area between ceramic and ion conductive matrix 10m the overall interface contact resistance may be reduced. The interface area between ceramic and ion conductive matrix 10m may be improved by a) infiltrating the polymer matrix with an amount of ceramic material, b) deceasing the size of ceramic domains in the hybrid layer 10h1, and/or c) forming a hybrid layer with increasing volume, e.g. increasing the thickness of the hybrid layer.

In a preferred embodiment the hybrid layer comprises at least 5 volume percent of ceramic material, preferably between 10 and 90% by volume, more preferably between 20 and 80 vol %, even more preferably between 30 and 60 vol %. Providing the hybrid layer with more equal volumes of ceramic material and ion conductive matrix 10m may increase the interface area between these materials. Inventors find that such an infiltration may also increase the bulk conductivity of the hybrid because the nanoparticles helps in lowering the Tg of the polymer matrix.

The first ceramic material C1 may comprise one more of: a single oxide of a metal or metalloid; (MO); a binary oxide;

(M1M2O); or a higher order oxide, e.g. ternary oxide (M1M2M3O); a sulfide; a nitride; or a halide, e.g. chloride or fluoride.

By infiltrating the ion conductive matrix with the ceramic material the ion conductive properties of the polymer and dispersed metal salt may advantageously be maintained. By infiltrating a ceramic material into the ion conductive matrix, an interface is formed having a large surface area. Preferably the ceramic may be present in the interstices of the ion conductive matrix 10*m*. Providing a hybrid layer with a large interface area may improve adhesion between the ceramic material and matrix. Providing a hybrid layer with a large interface area may improve the ion conductivity within said layer. For example, ions may preferentially diffuse along an interface between the ceramic domains and matrix material.

Providing the solid state electrolyte 10 with a ceramic material may improve the contact, e.g. by reducing the interface resistance, between the solid state electrolyte 10 and other functional layers, e.g. electrode material layers, in a battery stack. In addition, the interface ceramic material could also be chosen so as to have an enhanced ion-injection behavior to/from the electrodes; at least better than the intrinsic polymer-electrodes ion-injection properties. For example, providing the solid state electrolyte 10 at a face for contacting to a negative electrode material, e.g. metallic lithium, with a suitable hybrid layer may reduce interface resistance. Alternatively or in addition, the interface ceramic material could be chosen so as to have an enhanced ion-injection behavior to/from the electrodes. A battery wherein the solid state electrolyte 10 is provided with a hybrid layer at the interface for connecting to the negative electrode may, for example during a charging cycle, has improved performance at low temperatures. Such improved performance may be the result of reduced contact resistance. Further such battery maybe provided with improved charging characteristics due of improved homogeneity of the electric field at the interface between negative electrode and solid state electrolyte 10. Providing the hybrid layer with small ceramic domains may further improve said effects. Alternatively or additionally, providing the solid state electrolyte 10 with a ceramic material may improve mechanical contact, e.g. improve adherence, between interfaces and layers in a battery stack. Improved mechanical contact may mitigate damage to battery stacks, for example cause by delamination of functional layers. Alternatively or additionally, providing the solid state electrolyte 10 with a ceramic material may improve the mechanical properties of the solid state electrolyte. This may improve handling of a layer of solid state electrolyte 10 and reduce the risk of damage to the solid state electrolyte 10 for example due to tearing.

In some embodiments, both faces of the ion conductive matrix 10*m* for connecting to the electrodes, are infiltrated with ceramic material C1,C2 to form first and second hybrid layers 10*h*1, 10*h*2. The second hybrid layer may comprise the same ceramic material as the first hybrid layer. Alternatively, the second hybrid layer may comprise a second ceramic material C2. By providing the second hybrid layer with a different ceramic material, a solid state electrolyte 10 may be formed wherein the adhesive and electrical properties of the face of the solid state electrolyte 10 for connecting to a negative electrode and the face of the solid state electrolyte 10 for connecting to a positive electrode, may be tuned independently. The thickness of the first and second hybrid layers may be different, and tuned independently from each other, wherein each layer encompasses at least 1% of the thickness of the ion conductive matrix 10*m*. Optionally, the hybrid layers may by both or individually thicker, e.g. 5%, 20%, 50%, or more, up to 99%, for example, extending all the way to the opposing hybrid layer.

In particular cases, infiltrating a polymer matrix with ceramic material at the side facing Li-metal improves cycling stability, and may mitigate safety concerns.

The ceramic material may be a ceramic Li-ion electrolyte, for instance LIPO(N), or an oxide like e.g. TiO2, AlxOy, ZrOx, ZnOy, or Lithium salts. This may improve cycling stability by an improved mechanical strength of the membrane in addition to favorable interface kinetics. As an additional aspect, a high dielectric ceramic material with dielectric constant >20 or even >200 may be chosen to homogenize Li-metal growth by dielectric screening, and prevent dendrite growth.

Further, combining 2 ceramic materials, e.g. a high dielectric and a Li-ion electrolyte, in a 2-step process, can be used to combine both beneficial aspects A specific embodiment consists of:

1. A Copper foil substrate, coated with a Li-metal layer of <4 um thickness (both sides)

2. Then a polymer membrane, infiltrated with ceramic material at the side facing the Li-metal layer is stacked, for example by—but not limited to—hot pressing. An additional adhesion/wetting layer (e.g. gel or plastic electrolyte, or liquid electrolyte or ionic liquid) may be deposited onto Li-metal/membrane prior stacking, to improve adhesion and interface kinetics.

In another or further preferred embodiment, the solid state electrolyte 10 is further provided with one or more capping layers 10*c*. These capping layers may be provided to one or more of the faces for connecting to the electrode. The one or more capping layers preferably comprise an ion conductive ceramic material. For capping layers provided to the face for connecting to a negative electrode, the capping layer may, alternatively or in addition, comprise a ceramic material that forms an ion conductive material from a reaction between the ceramic material and a negative electrode material. In some preferred embodiments, both faces of the solid state electrolyte 10 for connecting to the electrodes are provided with a capping layer wherein the first and second capping layer may comprise the same or different capping materials The ceramic material comprised in the one or more capping layers may comprise one or more of: an ion conductive ceramic material, and a ceramic material that forms an ion conductive material from a reaction between the ceramic material and a negative electrode material. The ceramic material comprised in the one or more hybrid layers may also comprise one or more of: an ion conductive ceramic material, and a ceramic material that forms an ion conductive material from a reaction between the ceramic material and a negative electrode material. Alternatively, the ceramic material comprised in the one or more hybrid layers may also comprise a material that is not ion-conductive. In such case ion conductivity in the hybrid layer may be provided by one or more of the ion conductive matrix 10*m* and the interface between the ceramic and the ion conductive matrix. Preferably the capping layers comprise a ceramic material that provides a good interface with the respective electrode material it may be contacted with. By providing the solid state electrolyte 10 with a suitable capping layer a battery may be manufactured with improved interface properties between solid state electrolyte 10 and the positive electrode material and/or with improved interface properties between solid state electrolyte 10 and the negative electrode material. Improved interface properties may be classified by improved adhesive properties e.g.

adhesive strength and/or reduced contact resistance and/or improved ion conduction and/or improved (electro-)chemical stability and/or to mitigate dendrite penetration.

The interface stability and ion kinetics at the cathode side of Li-ion batteries can thus be improved. E.g. polymer membranes may suffer from limited stability towards high voltage (>3.8 V) cathode materials. To improve stability an oxide like e.g. TiO2, AlxOy, ZrOx, or ceramic Li-ion electrolyte with high stability against high voltage materials may be selected as ceramic material, infiltrating the side facing the cathode.

A specific example of a such a stack:

1. A porous cathode layer is deposited on a metal substrate, comprising a cathode material (e.g. NMC, LMNO, LCO), carbon black, binder, 2. The porous cathode layer may be filled with a catholyte, e.g. liquid electrolyte, ionic liquid, plastic electrolyte, with good stability at cathode interface.

3. The hybrid polymer membrane, infiltrated with ceramic material at the side facing the cathode, is stacked to act as separator in between cathode and anode, for instance by hot pressing. The ceramic material improves stability at the contact points with the cathode.

Preferably, the ceramic material forming the capping layer is selected to form a capping layer with good adhesion properties to an electrode material, e.g. wetting properties. In some embodiments, wherein the solid state electrolyte 10 is for use with a lithium metal negative electrode, the solid state electrolyte 10 is preferably provided with a capping comprising a lithiophilic material. By providing the solid state electrolyte 10 with a lithiophilic capping layer, lithium batteries may be manufactured, wherein a more even lithium electrode may be formed, e.g. during a first charging cycle. In embodiments wherein a capping layer is provided to the face of the solid state electrolyte 10 for connecting to a metal electrode, the capping preferably has a modulus higher than the modulus of the negative metal electrode. For example, for solid state electrolytes for use in lithium metal batteries, the hardness of the capping layer preferably exceeds 4.9 GPa. By providing the solid state electrolyte (10) with a capping layer with a hardness that exceeds the hardness of the metal electrode, dendrite formation may be mitigated.

In other or further embodiments a further ceramic capping is provided onto a first capping layer, forming a laminate multilayer solid state electrolyte 10, e.g. a solid state electrolyte (10) comprising a stack of capping layers, wherein the further ceramic capping material is ionically conductive or the reaction product of a metal electrode material and the further ceramic capping material is ionically conductive.

Figure 2A:
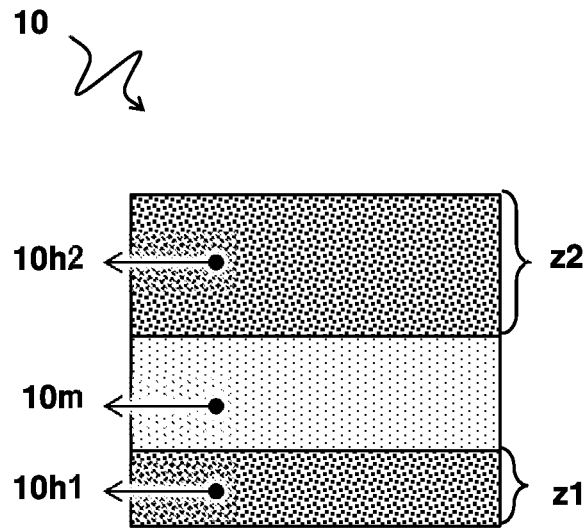
FIG. 2A-D illustrate four exemplary embodiments of a solid state electrolyte comprising hybrid layers and/or capping layers at one or more faces of the solid state electrolyte for connecting to the negative or positive electrode in a battery.
Figure 2B:
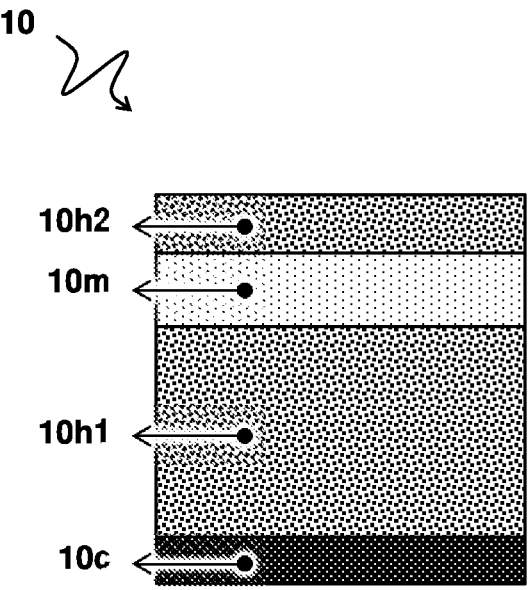
Figure 2C:
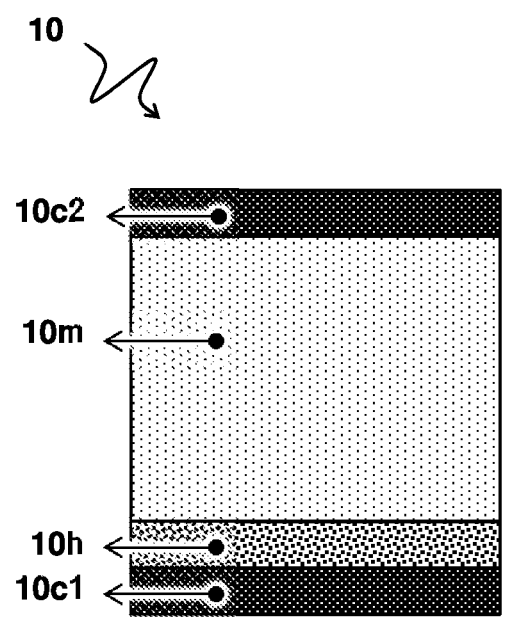
Figure 2D:
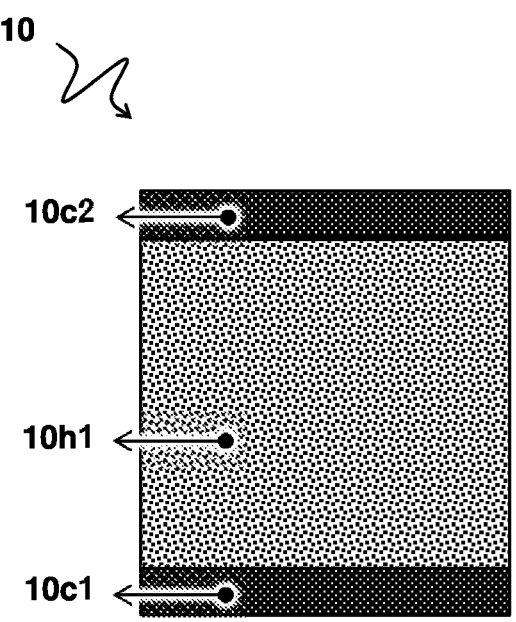

FIG. 2A-D schematically depict cross-section views of four embodiments of solid state electrolytes 10 wherein one or more of the hereinabove described features are incorporated. FIG. 2A depicts an exemplary embodiment of the solid state electrolyte 10, wherein two opposing faces of the ion conductive matrix 10m are provided with hybrid layers 10h1 and 10h2 having differing thicknesses z1 and z2. FIG. 2B depicts an exemplary embodiment of the solid state electrolyte 10 wherein two opposing faces of the ion conductive matrix 10m are provided with hybrid layers and wherein one of the faces of the solid state electrolyte 10 is further provided with a ceramic capping layer 10c. FIG. 2C depicts an exemplary embodiment of the solid state electrolyte 10 comprising a capping layer and a hybrid layer on a first face and a second capping layer 10c at the opposing face of the solid state electrolyte 10. FIG. 2D depicts an exemplary embodiment of the solid state electrolyte 10 wherein the hybrid layer in infiltrated over the complete thickness of the ion conductive matrix and wherein the infiltrated ion conductive matrix 10m is further provided with first and second capping layers 10c1, 10c2 on opposing faces. It will be appreciated that the depicted exemplary embodiments are not to be understood as limiting examples. The invention further relates to solid state electrolytes 10 comprising different or further combinations of ion conductive matrices, hybrid layers, and ceramic capping layers.

In a preferred embodiment, the ion conductive matrix 10m may be provided with a first ceramic capping at the face for connecting with a negative electrode material (anode) and may be impregnated with a second ceramic material at a face for interfacing with a positive electrode material (cathode). In another or further preferred embodiment, the ion conductive matrix 10m may be provided with a first ceramic capping at a face for connecting with a positive electrode material (cathode) and impregnated with a second ceramic material at a face for interfacing with a negative electrode material (anode),In some embodiments the solid electrolyte 10 comprises capping layers at both faces of the ion conductive matrix 10m for connecting to the electrodes.

It will be appreciated that the one or more hybrid layers and one or more capping layers may be formed using same ceramic materials. Advantageously, the ceramic materials comprised in the hybrid and/or capping layers may selected independently. By impregnating and covering the solid state electrolyte 10 with different ceramic materials, the conductive and interface properties of the formed solid state electrolyte may be optimized independently. For example, a first ceramic material may be selected to impregnate the ion conductive matrix 10m, whereas a second, possibly different, ceramic material may be selected for optimal mechanical properties and/or optimal contact resistance at an interface with an electrode material.

Figure 3A:
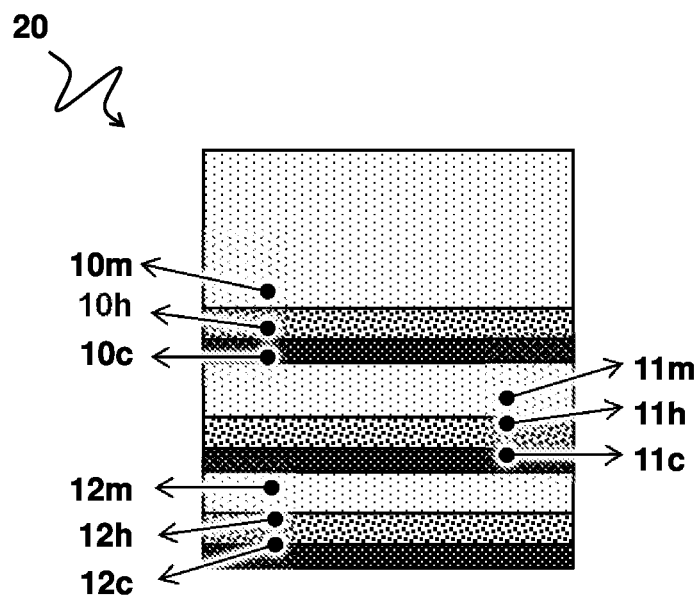
FIG. 3A illustrates a multi-layered solid state electrolyte formed by a stack of solid state electrolyte layers.
Figure 3B:
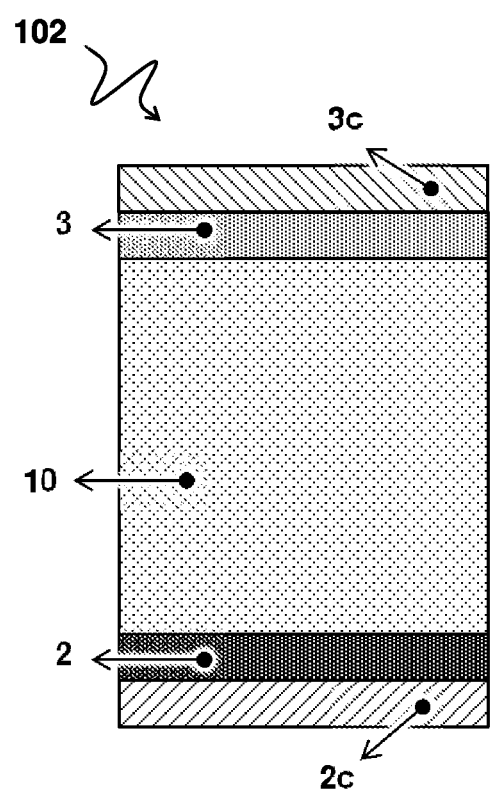
FIG. 3B-C illustrate exemplary 2D- and 3D-batteries comprising the solid state electrolyte.

In one embodiment, e.g. as shown in FIG. 3A, the disclose further relates to a multi-layered solid state electrolyte 20. The multi-layered solid state electrolyte may be formed by a stack of two or more of the solid state electrolyte layers 10 according to the invention. In the exemplary embodiment as shown the multi-layered solid state electrolyte comprises a three ion conductive matrices 10m, 11m, and 12m, three hybrid layers 10h, 11h, and 12h, and three capping layers 10c, 11c, and 12c. It will be appreciated that the multi-layered solid state electrolyte 20 is not limited to the embodiment as shown. Other stacks formed from two or more of any of the solid state electrolytes 10 as described herein as envisioned as well.

Figure 3C:
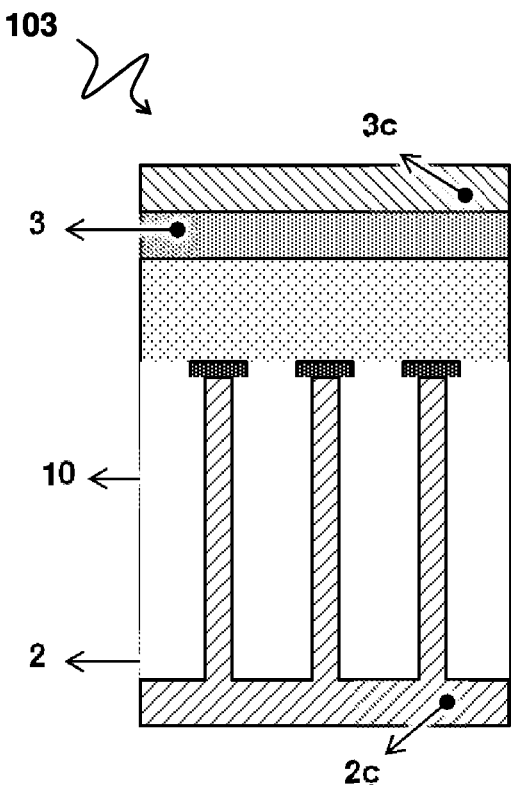

It will be further appreciated that aspects of the invention further relate to a battery comprising a solid electrolyte 10 according to any of the preceding claims. In one embodiment, e.g. as shown, in FIG. 3A a battery 102 is formed with an essentially 2D layered architecture. The exemplary 2D battery stack is depicted in a cross section view and comprises a negative electrode layer 2 connected to a current collector 2c; a positive electrode layer 3 connected to a current collected 3c; and a solid state electrolyte 10 according any of the solid state electrolytes 10 describe herein. Advantageously, the process for the manufacturing of the solid state electrolyte 10 according to the invention may also be compatible with manufacturing processes of 3D batteries. A 3D battery typically comprises a structured current collector formed of a base structure comprising an array of conductive elements spaced at a distance from one another and extending in a direction away from said base. Onto these elements further functional layers, e.g. electrode, and/or electrolyte, are provided, preferably in a conformal way such that the 3D cell comprises a larger interface area between functional layers, and may provide larger currents, than a corresponding 2D cell. Accordingly, in another or further embodiment, the present disclosure further relates to a battery 103 comprising a 3D-current collector structure, wherein at least one electrode material largely follows the 3D-structure. Optionally, more of the layers in the stack follow the 3D-structure at least partially. FIG. 3C depicts a cross-section view of a 3D battery comprising a negative electrode layer 2 connected to a 3D structured current collector 2c; a positive electrode layer 3 connected to a current collected 3c; and a solid state electrolyte 10 according any of the solid state electrolytes according to the invention. In some preferred embodiments the battery comprises: a negative electrode comprising metal lithium, a metal salt comprising lithium ions. Preferably, in such batteries, the solid state electrolyte 10, may be provided with a ceramic coating comprising a lithiophilic material.

Aspects of the present disclosure further relate to a process for the manufacture of solid state electrolytes. In one embodiment the manufacturing process comprises obtaining an ion conductive matrix 10m comprising a polymer P and a metal salt S dispersed in the ion conductive matrix. Preferably the ion conductive matrix 10m may be obtained in the form of a film wherein the film may be provided on a carrier substrate or alternatively, the ion conductive matrix may be provided as a free-standing film. The process for the manufacture of the disclosed solid state electrolytes further comprises feeding the ion conductive matrix 10m to a station for impregnating the layer with a ceramic material. In a preferred embodiment, impregnating may be performed by chemical vapor infiltration. Chemical vapor infiltration comprises exposing a face of the ion conductive matrix 10m with a vapor phase ceramic precursor material. The vapor phase ceramic precursor material, infiltrates into the ion conductive matrix 10m, and reacts with a co-reactant to form a hybrid layer. Optionally, the ceramic precursor material infiltrates the ion conductive matrix 10m across the whole thickness of the matrix forming a hybrid layer that extends over the complete thickness of the ion conductive matrix 10m. Suitable ceramic precursor materials typically comprise metalorganic compounds with low vapor pressure. Suitable co-reactants may be selected from a group consisting of water, $H_2S$, and oxidizing plasma. The co-reactant may also be provided in the gas phase.

The ion conductive matrix 10m may be provided on a substrate. Alternatively, the solid state electrolyte 10 may be manufactured using a free standing ion conductive matrix 10m film. Optionally, the manufacturing process of the solid state electrolyte 10 may be integrated into a manufacturing process of a battery comprising the solid state electrolyte 10 according to any of the preceding claims. For example, the substrate may comprise one or more of a current collector and an electrode material, e.g. an intermediate product during a layer-by-layer production process of a layered battery.

In a preferred embodiment, the infiltration process, is performed using a chemical vapor deposition process such as, chemical vapor deposition (CVD), physical vapor deposition (PVD) and atomic layer deposition (ALD) or spatially resolved version of thereof (sALD) or a gas-phase reaction within the matrix. Alternatively or in addition, the infiltration process may be performed using wet-chemical processes. Preferably, the ceramic precursor material and/or co-reactants are added in a time or spatially resolved way. By providing the ceramic precursor material and/or co-reactants in a time resolved or spatially resolved way, control over the reaction process, e.g. the amount and infiltration depth of formed ceramic material, may be obtained. By using an sALD process fabrication of the solid state electrolyte (10) may advantageously be integrated into a roll-to-roll production process.

Without wishing to be bound by theory it is believed that one or more of the aspects (i-vi) allow for formation of the hybrid layer: (i) by exposing a face of the ion conductive matrix 10m to a ceramic precursor material, e.g., a vapor phase ceramic precursor material, said precursor material may infiltrate, e.g. penetrate, the matrix towards its interior; (ii) penetration into the matrix may be facilitated by a form of diffusion of the (vapor phase) precursor material into or along pores or interstices of the ion conductive matrix 10m; (iii) inside these pores of interstices the ceramic precursor material may react with a co-reactant to form a ceramic material; (iv) since the ceramic is formed in the pores or interstices of the matrix, e.g. between adjacent chains of the polymer comprised in the matrix, formed ceramic domains may be small, e.g. formed ceramic domains may have a dimension, e.g. a diameter, in the mesoscale; (v) said co-reactant may also be provided in the vapor phase in which case it may also penetrate the ion conductive matrix 10m; (vi) by providing the ceramic precursor material and co-reaction in a time and/or spatially resolved way control may be obtained over the amount and/or penetration depth of said reactants into the ion conductive matrix 10m.

The amount of vapor phase ceramic precursor material that impregnates the ion conductive matrix 10m and the depth it impregnates into the matrix may be controlled by one or more of the exposure concentration and/or pressure, exposure temperature, exposure time and delay time between consecutive exposures. For example, increasing the exposure concentration, pressure, and/or time may increase the amount of formed ceramic. Increasing the delay between consecutive exposures may increase the time the precursor material can diffuse down into the ion conductive matrix 10m before reacting with a co-reactant, thus increasing the impregnation depth. Increased exposure temperature increases diffusion speed and may accordingly increase impregnation depth. In some preferred embodiments water is the intended co-reactant. Alternatively or in addition to providing water to the matrix from the gas phase, the ceramic precursor material may react to form a hybrid layer using water that may be dispersed throughout the ion conductive matrix 10m. Advantageously the polymer P comprised in the ion conductive matrix 10m is typically a polyether type polymer which take up water well. Incorporated water may be remnant from a formation or deposition process of said ion conductive matrix 10m. Optionally, the amount of water dispersed throughout the matrix may be controlled by application of one or more of a pressure and temperature gradient. In other words, suitable amounts of water may be provided to the matrix by controlled partial drying of a wet ion conductive matrix 10m. By providing the ion conductive matrix 10m with a suitable water profile the infiltration depth of the ceramic precursor material may be controlled. For example, by partially depleting water from the matrix near its surface, ceramic vapors may diffuse further down into the bulk of the matrix before reacting with water, or in other words, increasing the thickness of the hybrid layer. By increasing the amount of water throughout the matrix may cause reactive vapors to react closer to the surface, thus reducing the infiltration depth, or in other words, reducing the thickness of the hybrid layer.

Now with reference to FIG. 2A it will be understood a precursor diffusing from a face towards the bulk of the ion conductive matrix 10m forms a hybrid interface layer 10h1, 10$h$2 wherein the density of infiltrated ceramic material, expressed as a volumetric concentration of ceramic per volume unit of the hybrid layer, gradually decreases from an initial value at an outer face of the solid state electrolyte to a lower value towards the ion conductive matrix 10$m$. In some embodiments the volumetric concentration of ceramic material at an interface with the ion conductive matrix may be gradually decrease to zero. In other embodiments, e.g. wherein a ceramic precursor is provided from both ends, as shown in FIG. 2D, the volumetric concentration in the bulk of the solid state electrolyte may be higher, e.g. about five percent of the volumetric concentration at the outer interface, or e.g. more than ten or even twenty five percent. In some particular embodiments, e.g. wherein the exposure of precursor is continued until the ion conductive matrix is homogeneously saturated the formed hybrid interface layer may have a nearly uniform volumetric concentration of infiltrated ceramic material. The volumetric concentration of the ceramic material at the face of the ion conductive matrix for connecting to the negative or positive electrode will generally be higher that at the bulk of the solid state electrolyte. In some embodiments the volumetric concentration at the face of the ion conductive matrix for connecting to the negative or positive electrode will be ten percent or more, e.g. fifteen percent or thirty percent. In some embodiments, e.g. wherein a ceramic capping layer is formed on the hybrid interface layer (as shown FIG. 2D) a boundary between capping layer and hybrid layer may be absent, i.e. the hybrid layer may be understood to gradually continue into the capping layer. In other words, the volumetric concentration of the ceramic material at the face of the ion conductive matrix for connecting to the negative or positive electrode may be almost one hundred percent.

Further, as the ceramic precursors materials react to form ceramic material as they progressively diffuse through the ion conductive matrix to deeper depths the formed ceramic domains can have a shape resembling the diffusion pathway. For example, in homogeneous or dense ion conductive matrices diffusion pathways, e.g. voids, may be present, for example in the form of interstitial spaces, which may for example be present between adjacent polymer chains comprised in the medium. Accordingly, the formed ceramic material may take an elongate form comprising at least one dimension on a mesoscopic scale and an other dimension along a diffusion pathway which is longer than the first dimension, preferably by a factor of at least five, preferably more e.g. at least ten or even fifty. As ions may preferentially diffuse along an interface between the ceramic domains and matrix material, provision of elongate domains or an interconnected network of ceramic material can improve ion conductivity in the solid state electrolyte. The ceramic domains in the hybrid layer preferably have at least one dimension, e.g. a diameter, which has a size in a range larger than an atomic scale but smaller than a macroscopic scale. For example, as explained before, the mesoscopic dimension can be in the range of 1 nm to 5 µm, preferably in a range between 5 nm and 1 µm, more preferably between 10 nm and 500 nm. The dimension in the other direction may be as long as the thickness of the hybrid interface layer, e.g. from 10 nm up to 50 µm, more preferably in a range between 50 nm and 20 µm, most preferably in a range between 100 nm and 10 µm, e.g. 250 nm or 1 µm. Further, in some embodiments the ceramic domains may form an interconnected network, i.e. a connected ceramic porous network, wherein opposing portions are separated by ion conductive matrix (10$m$), as opposed to a homogeneously or randomly distributed composite of isolated particles in a matrix.

A continuous layer may be understood to include layers formed of or comprising a continuous matrix providing a continuous, i.e. ninterrupted, pathway through the layer from one face (e,g. a top face) to an opposing face (e.g. a bottom face). A continuous pathway, e.g. .an ion diffusion pathway is preferably not interrupted by an internal interface layer which may present an additional diffusion barrier and/or reduced mechanical properties, e.g. due to possible delamination at such interface. It will be appreciated that a continuous layer, e.g. an ion conductive matrix, may be a composite material, e.g. a blend or a copolymer, and/or may be understood to comprise inclusions, e.g. infiltrated ceramic domains.

In another or further preferred embodiment, the process further comprises providing one or more ceramic capping layers. Said ceramic material may be formed from a reaction between a suitable ceramic precursor material and a co-reactant. Preferably, said reactants are provided using chemical vapor deposition process such as CVD, PVD, ALD, and sALD. Alternatively or in addition reactants may be provided by wet chemical techniques including, but not limited to: spray coating, e.g. spray coating of nanoparticles. Advantageously, forming of the hybrid layer and the ceramic capping layer may be performed using the same tool, e.g. using the same process. Optionally, the capping layer may be formed using a different vapor deposition method. Optionally, the capping layer maybe formed from a different ceramic material. Optionally, further capping layers may be provided onto the formed capping layer.

In some preferred embodiments of the process one or more of: the ion conductive hybrid layer formation, and the capping layer formation are also performed on a second face of the ion conductive matrix 10$m$.

In other or further preferred embodiments, the process further comprises depositing an electrode material. Advantageously, the process may be integrated into a process for the manufacturing of a battery. Accordingly, following the formation of the solid state electrolyte 10, the process may comprise deposition of a positive electrode material onto the solid state electrolyte 10. Alternatively, a negative electrode material may be deposited following the formation of the solid state electrolyte 10.

The continuous ion conductive matrix may also be connected to a negative or positive electrode by melt infusion of the hybrid polymer membrane. A single continuous ion conductive electrolyte matrix is infiltrated with ceramic material. A face with highest volumetric ceramic content, is e.g. deposited onto a first electrode, which may be a cathode or anode, e.g. having a thickness of several 10s of microns up to 200 µm, having a porosity from 20% up to 95%. Then a melt-infusion process can be used to infiltrate the side of the hybrid polymer membrane without or with lower concentration of ceramic material into the pores of the first electrode. By increasing the temperature close to or slightly above the melting temperature of the conductive matrix and simultaneously applying pressure, the side facing the first electrode melts and may infiltrate into pores of the first electrode matrix, whereas the side facing away from the first electrode, having more ceramic material infiltrated, has a higher Tmelt and stays in solid/glassy/rubbery state.

The depth of infiltration of ceramic electrolyte may be typically 5 or 10 or 20 µm. A second electrode may be put directly on top, or an additional electrolyte layer (solid state, liquid electrolyte with or without separator membrane) may be used at the 2nd electrode side.

There can be more then one ceramic material in this example, either on one side, or at two sides, the main difference between the two sides is the average volumetric concentration of ceramics, which is lower at the side of the porous electrode to result in a melt infusion of this part into the porous electrode.

Such a process can be repeated to obtain alternating (cathode-anode-cathode) patterned electrodes, which together with the filled single continuous conductive matrix, to form a 3D Battery stack. The electrodes may be porous or non-porous, in the latter case e.g. a completely dense electrode. In addition to previously described functionalities (conductivity & stability improvements) a ceramic material like e.g. AlxOy, ZrOx being infiltrated at the top side can protect the 3D battery stack from degradation in contact with O, N, H2O rich environments.

A porous electrode may be filled with a single continuous ion conductive matrix, which may extend for e.g. 1, 5 10 20 40 um on top of the cathode material. Then the membrane is exposed to vapor deposition process, resulting in an infiltrated ceramic material at the top side. The ceramic material(s) may be a solid electrolyte, like LIPON, LAGP, or oxides, like AlxOy, TiOx, ZnOx, ZrOx, a Li-salt, or combinations thereof

The invention claimed is:

1. A solid state electrolyte for providing an ion conductive connection between a negative and positive electrode in a battery, the solid state electrolyte comprising:
   a continuous ion conductive matrix comprising a polymer,
   a metal salt dispersed in the continuous ion conductive matrix, and
   a first ceramic material,
   wherein at least one of a first face of the continuous ion conductive matrix and a second face of the continuous ion conductive matrix, configured for connecting to the negative electrode or positive electrode, is infiltrated with the first ceramic material to form a first hybrid interface layer between at least one of the negative electrode and the positive electrode in the battery and the continuous ion conductive matrix, and
   wherein a concentration of the first ceramic material, at the first face and the second face of the continuous ion conductive matrix, is greater than a concentration of the first ceramic material at a remainder of the continuous ion conductive matrix that is not part of the first face of the continuous ion conductive matrix and the second face of the continuous ion conductive matrix.

2. The solid state electrolyte according to claim 1, wherein both the first face and the second face of the continuous ion conductive matrix, configured for connecting to the electrodes, are infiltrated with a ceramic material to form a first hybrid interface layer and a second hybrid interface layer.

3. The solid state electrolyte according to claim 1, wherein one or more of the first face and the second face of the continuous ion conductive matrix is provided with a first capping layer, wherein the first capping layer comprises one or more materials taken from the group consisting of:
   an ion conductive ceramic material, and
   a ceramic material that forms an ion conductive material from a reaction between the ceramic material and a negative electrode material.

4. The solid state electrolyte according to claim 3, wherein the continuous ion conductive matrix is:
   provided with the first ceramic capping at a face for connecting with a negative electrode material, and
   impregnated with a second ceramic material at a face for interfacing with a positive electrode material.

5. The solid state electrolyte according to claim 3, wherein the continuous ion conductive matrix is:
   provided with the first ceramic capping at a face for connecting with a positive electrode material, and
   impregnated with a second ceramic material at a face for interfacing with a negative electrode material.

6. The solid state electrolyte according to claim 1, wherein both the first face and the second face of the continuous ion conductive matrix, configured for connecting to the electrodes, are provided with a respective capping layer.

7. A multi-layered solid state electrolyte formed by a stack of solid state electrolyte layers according to claim 1.

8. A battery comprising a solid state electrolyte, according to claim 1, provided between a positive and a negative electrode.

9. The battery according to claim 8, wherein:
   the negative electrode comprises lithium,
   the metal salt comprises lithium ions, and
   a ceramic coating facing the negative electrode, wherein the ceramic coating comprises a lithiophilic material.

10. A process for manufacturing a solid state electrolyte for providing an ion conductive connection between a negative and positive electrode in a battery, the solid state electrolyte comprising:
    a continuous ion conductive matrix comprising a polymer,
    a metal salt dispersed in the continuous ion conductive matrix, and
    a first ceramic material,
    wherein at least one of a first face of the continuous ion conductive matrix and a second face of the continuous ion conductive matrix, configured for connecting to the negative electrode or positive electrode, is infiltrated with the first ceramic material to form a first hybrid interface layer between at least one of the negative electrode and positive electrodes in the battery and the continuous ion conductive matrix;
    wherein the process comprises:
       providing the continuous ion conductive matrix comprising a polymer and dispersed metal salt;
       feeding the continuous ion conductive matrix to a station for impregnating the first hybrid interface layer with a ceramic material; and
       exposing a first face of the continuous ion conductive matrix with a vapor phase ceramic precursor material using a chemical vapor impregnation method,
    wherein the vapor phase ceramic precursor material:
       infiltrates into the continuous ion conductive matrix, and
       reacts with a co-reactant to form a hybrid interface layer forming an interface layer between at least one of a negative electrode and a positive electrode in a battery and the continuous ion conductive matrix comprised therein.

11. The process according to claim 10 wherein the chemical vapor impregnation method is any one or more methods selected from the group consisting of:
    chemical vapor deposition, physical vapor deposition, atomic layer deposition, and
    spatially resolved ALD.

12. The process according to claim 10, comprising providing a ceramic capping layer.

13. The process according to claim 12, wherein one or more of continuous ion conductive hybrid interface layer forming or capping layer providing are performed on a second face of the continuous ion conductive matrix.

14. The process according to claim 10 further comprising depositing a positive electrode material and negative electrode material.

15. The process according to claim 11, wherein impregnation depth of the vapor phase ceramic precursor material is controlled by one or more of the group consisting of:
- exposure concentration,
- exposure pressure,
- exposure temperature,
- exposure time, and
- delay time between consecutive exposures.

16. The solid state electrolyte according to claim 2, wherein the ceramic material of the second hybrid interface layer comprises a second ceramic material that differs from the ceramic material of the first hybrid interface layer.

17. The solid state electrolyte according to claim 2, wherein the ceramic material of the second hybrid interface layer is the same as the ceramic material of the first hybrid interface layer.

18. The process according to claim 10, wherein a concentration of the first ceramic material, at the first face and the second face of the continuous ion conductive matrix, is greater than a concentration of the first ceramic material at a remainder of the continuous ion conductive matrix that is not part of the first face of the continuous ion conductive matrix and the second face of the continuous ion conductive matrix.

\* \* \* \* \*